Oct. 16, 1923.
F. R. ELLIS
1,471,112
APPARATUS FOR COOLING AIR
Filed Dec. 13, 1919
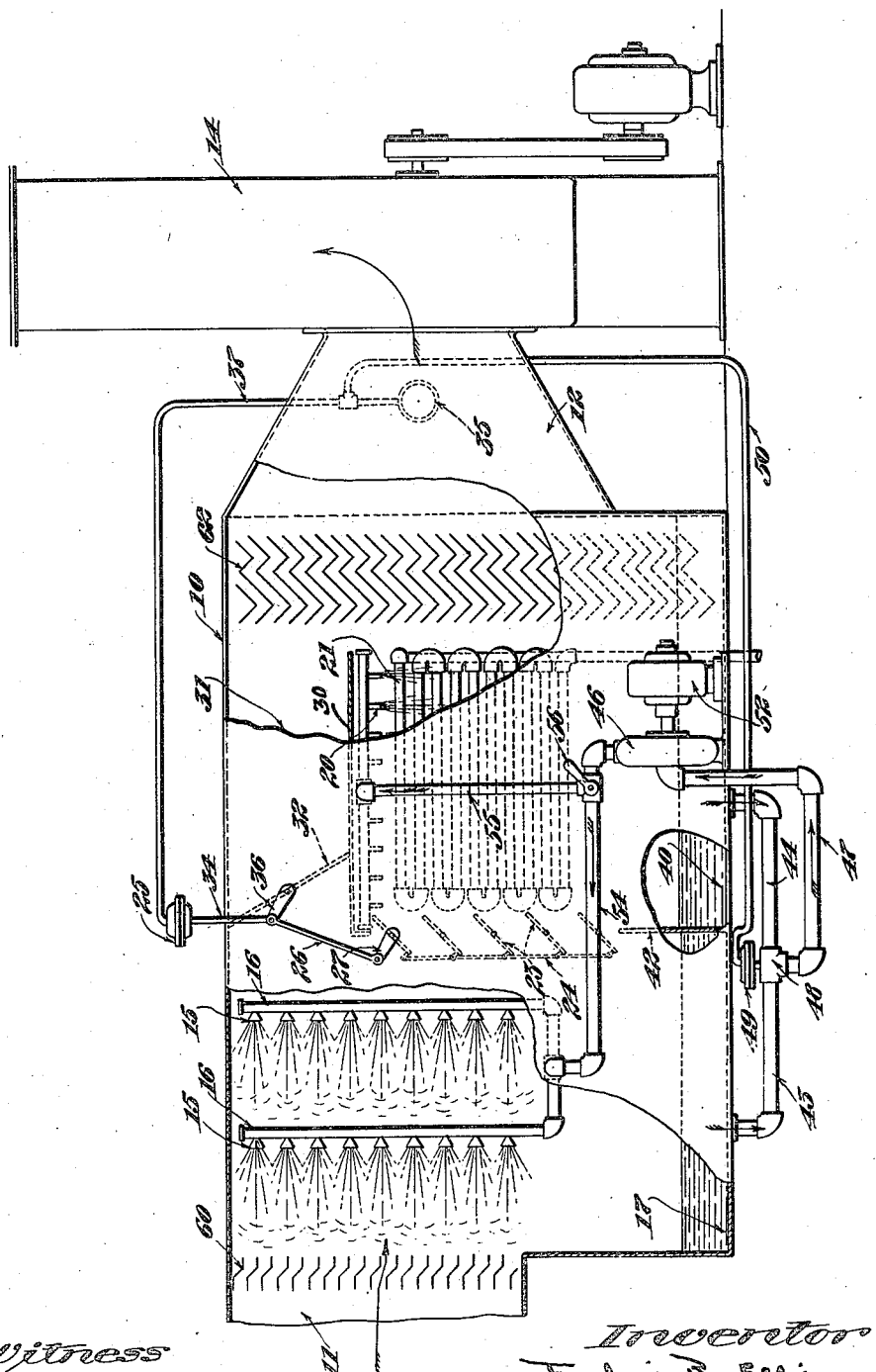

Patented Oct. 16, 1923.

1,471,112

UNITED STATES PATENT OFFICE.

FREDERIC R. ELLIS, OF HYDE PARK, MASSACHUSETTS, ASSIGNOR TO B. F. STURTEVANT COMPANY, OF BOSTON, MASSACHUSETTS, A CORPORATION OF MASSACHUSETTS.

APPARATUS FOR COOLING AIR.

Application filed December 13, 1919. Serial No. 344,721.

*To all whom it may concern:*

Be it known that I, FREDERIC R. ELLIS, a citizen of the United States, residing at Hyde Park, Boston, in the county of Suffolk and State of Massachusetts, have invented certain new and useful Improvements in Apparatus for Cooling Air; and I do hereby declare the following to be a full, clear, and exact description of the invention, such as will enable others skilled in the art to which it appertains to make and use the same.

The present invention relates to an apparatus for cooling air, and more particularly to an apparatus of this type in which the air is automatically maintained at a predetermined temperature.

An apparatus of this character is adapted primarily for use in buildings where it is desired to maintain the air in a room at a temperature below that of the atmospheric air, more particularly in the summertime or in localities where the atmospheric air is normally hot and moist.

The object of the present invention is to provide an improved apparatus for cooling the temperature of atmospheric air to a predetermined point and to increase the sensitiveness of control and simplify the operation thereof.

The accompanying drawing illustrates diagrammatically one form of apparatus embodying the features of the present invention and adapted to carry out the improved method.

According to the present invention, the atmospheric air is first caused to traverse through one or more banks of spray nozzles which are adapted to spray cold water into the hot air. This cold water substantially lowers the temperature of the incoming air and at the same time condenses a certain portion of the moisture retained in the air, depending upon the degree of cooling effected. The spray water for cooling the air may be conveniently maintained at the desired low temperature by passing it over suitably arranged cooling coils, and in addition, these cooling coils may be utilized to either cool all or part of the atmospheric air in the event that the initial spray of cold water is insufficient to reduce the temperature to the desired point. According to the present invention, then, the air after its passage through the spray of cold water may be delivered to the desired point without further cooling, or the body of air, either in whole or in part, may be passed over the cooling coils to further reduce the temperature of the air. It will be evident that by suitably controlling the passage of the air and diverting a portion of it through the cooling coils, any desired temperature of the air in the room may be maintained even though the temperature of the atmospheric air may vary within substantial limits.

The present apparatus is designed to control the temperature of the air automatically, and to this end a thermostat of suitable design is located in the air duct to be engaged by the air after its passage through the cooling mediums. Under normal conditions the control of the temperature may be effected substantially entirely by varying through the thermostat the temperature of the water delivered to the nozzles. This is conveniently accomplished by drawing the water for the spray in part from a warm water sump in the spray chamber and in part from the cold water sump located in the refrigerating chamber beneath the refrigerating coils. If this is insufficient to maintain the temperature of the air at the desired point, the thermostat then operates the dampers for controlling the flow of air either across the refrigerating coils or by-passes the air thereabout. It may be assumed that if the temperature of the atmospheric air is at 70° to 75° with a normal humidity, and it is desired to reduce this temperature to 50°, this will be accomplished by spraying into the air water which is drawn in substantially equal parts from the warm and cold water sumps. If the temperature of the atmospheric air rises, or the humidity increases, the thermostat will then act to increase the percentage of cold water delivered to the spray nozzles until all of the water delivered to the nozzles is drawn from the cold water sump. During this period, all of the air passing through the apparatus is by-passed about the refrigerating coils. If this cold water is still insufficient to maintain the temperature of the air at the desired low point, the dampers are gradually opened by the thermostat, causing an increasingly large proportion of the air to pass across the refrigerating coils and a correspondingly smaller proportion of the air to be by-passed thereabout. If the temperature of the atmospheric air, upon the other hand, drops from the above mentioned normal point, an increasingly large proportion of water for the spray nozzles will be drawn from the warm water sump so-called until substantially all of the water may be drawn from this part of the apparatus. In this connection, it is interesting to point out that under certain conditions of hot, dry atmospheric air, the evaporation of the water from the spray which is taken up by the air is sufficient to cool the air from 20° to 25° and in certain cases it may be sufficient to merely pump the warm water to the spray nozzles without any further refrigeration.

The apparatus shown in the illustrated embodiment of the invention comprises a casing 10 having an intake duct 11 and a delivery duct 12 connecting with a fan (not shown) which is enclosed in a casing 14. The atmospheric air, upon entering the cooling apparatus through the passage 11, first meets with cold water sprays issuing from a series of spray nozzles 15 mounted upon spray heads 16. These sprays of cold water pass through the body of air and are delivered to a warm water sump 17 formed in the bottom of the housing 10 carrying therewith moisture which is condensed from the warm air. The water in the sump, of course, is at a substantially higher temperature than the water issuing from the spray nozzles, due to the heat which has been removed from the air. This water is then drawn from the sump and pumped to spray nozzles 15 and delivery nozzles 20, or other suitable devices for distributing it over the refrigerating coils 21. The entrance to these cooling coils is controlled by a series of dampers 23 which are connected together by a link 24 and operated in unison from a diaphragm motor 25 through a connecting rod 26 and crank arm 27. Separated from the cooling coils by a horizontal partition 30 extending completely across the housing 10 is a by-pass duct 31, the entrance to which is controlled by a damper 32. This damper 32 is likewise connected to the control motor 25 through a connecting rod 34 and crank arm 36. With this series of connections, the damper 32 completely closes the opening in the by-pass duct 31 when the dampers 23 are opened to permit passage of the air through the cooling coils 21. As the dampers 23 are partially closed, upon the other hand, the damper 32 is opened to a corresponding degree. This control, in connection with the control of the mixture to be presently described, serves to maintain a constant temperature of the cooled air independently of variations in the temperature of the atmospheric air. The control of the damper motor is conveniently accomplished through a thermostat 35 which may be located in the delivery duct 12 and is connected with the motor 25 through a pressure pipe 37. A cold water sump indicated at 40 is located beneath the cooling coils to receive the chilled water which has been distributed over the coils. This cold water sump is separated from the warm water sump by a vertical transverse partition 42 extending across the housing 10. This partition is so designed that if the water level in either sump exceeds a predetermined level, it will overflow into the next adjacent sump. The warm water sump is provided with a delivery pipe 43 and the cold water sump with a delivery pipe 44, both of which are connected to the intake of a pump 46 through a common intake pipe 47 and mixing valve 48. The position of the mixing valve is controlled by a diaphragm motor indicated at 49 which is connected with the thermostat through a pressure pipe 50. The pump 46 may be operated by a motor indicated at 52 and delivers the water to the spray heads 16 through a pipe 54. This pipe also communicates with the cooling coils 21 through a branch connection indicated at 55. This causes a portion of the water delivered by the pump to flow to the spray nozzles and a portion to be delivered to the distributing nozzles 20 for cooling purposes. The proportion of water delivered respectively to the nozzles 15 and nozzles 20 may be determined by a valve 56 located at the intersection of the pipes 54 and 55 and manually operated.

The thermostat and diaphragm motors 25 and 49 controlled thereby are designed in such a manner that upon slight variations in the temperature of the air, the position of the mixing valve 48 is varied, and if this is insufficient to restore the temperature to the desired point, the diaphragm motor 25 operates to vary the position of the dampers 23 and 32.

The intake 11 of the housing 10 is preferably provided with a series of baffle plates 60 to properly distribute the air throughout the cooling spray in the usual manner. In addition, a series of eliminator plates 62 extend from top to bottom of the housing in advance of the delivery duct 12 to precipitate any unevaporated moisture which may be carried in the air. These eliminator plates, as illustrated in the drawing, extend from the top of the housing downwardly inside of the cold water sump 40 and below the normal level of water within this sump so that substantially all of the moisture collected thereon is delivered to the sump.

It should be understood that the present apparatus may be employed in connection with a system where the cooled saturated air is later reheated to a higher temperature to deliver heated air having a moisture content at less than the saturation point.

I claim:

1. An apparatus for cooling air comprising spray nozzles across which the air passes, cooling coils, an air duct by-passing the cooling coils, warm and cold water sumps, means for delivering water from the two sumps to the spray nozzles and cooling coils, means for regulating the flow of air across the coils and through the by-pass duct, and a thermostat for controlling the mixture of water delivered to the spray nozzles and the regulating means for the air.

2. A cooling apparatus comprising a series of spray nozzles, warm and cold water sumps, means for delivering a mixture of water from the two sumps to the nozzles to cool the air flowing thereby, cooling coils located behind the spray nozzles, a separate passage above the cooling coils, dampers for controlling the entrance to the cooling coils and the passage, a thermostat, means controlled by the thermostat for regulating the temperature of the water to the spray nozzles in accordance with the temperature of the air, and connections between the thermostat and dampers for actuating the dampers in accordance with the temperature of the air.

3. An apparatus for cooling air comprising an elongated housing, spray nozzles located in the housing adjacent the in-take end, cooling coils supported in the housing behind the spray nozzles, a horizontal partition above the cooling coils to provide a separate air passage, dampers controlling the entrance to the cooling coils and passage, warm and cold water sumps in the lower portion of the housing beneath the spray nozzles and cooling coils respectively, and a series of eliminator plates extending from top to bottom of the housing adjacent the delivery end.

FREDERIC R. ELLIS.